(12) United States Patent
Pellarin et al.

(10) Patent No.: US 7,504,792 B2
(45) Date of Patent: Mar. 17, 2009

(54) METHOD OF CONFIGURING A CONTROL UNIT OF AN ACTUATOR

(75) Inventors: Florent Pellarin, Saint-Martin Bellevue (FR); Dirk Mommaerts, Hirrlingen (DE); Juergen Lasar, Moessingen (DE)

(73) Assignee: Somfy SAS, Cluses (FR)

( * ) Notice: Subject to any disclaimer, the term of this patent is extended or adjusted under 35 U.S.C. 154(b) by 5 days.

(21) Appl. No.: 11/656,248

(22) Filed: Jan. 22, 2007

(65) Prior Publication Data

US 2007/0170882 A1 Jul. 26, 2007

(30) Foreign Application Priority Data

Jan. 23, 2006 (FR) .................................. 06 00576

(51) Int. Cl.
*H02P 1/04* (2006.01)
(52) U.S. Cl. ...................... 318/466; 318/268; 318/280; 318/282
(58) Field of Classification Search ................ 318/268, 318/280, 282, 286, 466, 560, 687
See application file for complete search history.

(56) References Cited

U.S. PATENT DOCUMENTS

| 5,146,417 | A |   | 9/1992  | Watson            |         |
|-----------|---|---|---------|-------------------|---------|
| 5,198,974 | A |   | 3/1993  | Orsat             |         |
| 5,689,160 | A | * | 11/1997 | Shigematsu et al. | 318/281 |
| 6,026,339 | A | * | 2/2000  | Williams          | 701/37  |
| 6,137,255 | A | * | 10/2000 | Skalski           | 318/687 |
| 6,426,604 | B1|   | 7/2002  | Ito et al.        |         |
| 6,452,353 | B1| * | 9/2002  | Calamatas         | 318/466 |
| 6,646,399 | B2|   | 11/2003 | Kitamura          |         |
| 6,879,122 | B1| * | 4/2005  | Stewart et al.    | 318/280 |
| 7,002,310 | B2|   | 2/2006  | Cavarec et al.    |         |
| 7,034,486 | B1| * | 4/2006  | McMahon           | 318/466 |
| 7,315,146 | B2| * | 1/2008  | Bejean            | 318/468 |
| 2001/0000294 | A1 |   | 4/2001 | Kitamura        |         |
| 2004/0187387 | A1 |   | 9/2004 | Hedrich         |         |
| 2005/0288840 | A1 |   | 12/2005| Suzuki          |         |

FOREIGN PATENT DOCUMENTS

| DE | 200 00 682 U    | 5/2000  |
| EP | 0 389 155 A     | 9/1990  |
| EP | 0 573 388 B     | 9/1996  |
| EP | 1 612 629 A     | 1/2006  |
| FR | 2 691 746       | 12/1993 |
| FR | 2 793 832       | 11/2000 |
| WO | WO 2005/085578 A| 9/2005  |

* cited by examiner

*Primary Examiner*—Bentsu Ro
*Assistant Examiner*—Thai Dinh
(74) *Attorney, Agent, or Firm*—Ronald R. Santucci; Frommer Lawrence & Haug, LLP

(57) ABSTRACT

A method of configuring a control unit (CPU) of an actuator (ACT) including a motor (MOT) for operating a movable element (COV) of a home automation equipment item (INST) of closure, privacy, sun protection or screening, which comprises:
  a phase for supplying the motor during which at least one characteristic quantity (MV1, MV2, MZ1, MZ2) of the movement of the movable element is obtained with the aid of a measurement procedure comprising at least one step of integrating a physical quantity supplied by an accelerometer (ACC), at least one quantity (ROT, ROT1, ROT2) internal to the actuator being measured during this supply phase, and
  a phase for determining a relation (REL) between the characteristic quantity and the internal quantity.

8 Claims, 2 Drawing Sheets

METHOD OF CONFIGURING A CONTROL UNIT OF AN ACTUATOR

This application claims priority benefits from French Patent Application No. 06 00576 filed Jan. 23, 2006.

The invention relates to a method of configuring a control unit of an actuator according to the preamble of claim 1. The invention also relates to a method of controlling an actuator including a motor for operating a movable element of a home automation equipment item of closure, privacy, sun protection or screening. The invention also relates to a home automation equipment item of closure, privacy, sun protection or screening comprising a movable element.

BACKGROUND OF THE INVENTION

It is a known practice to control the automatic operation of movable home automation equipment items comprising a movable element, for example a roller blind, a garage door, a linear movement gate, a rotary movement gate, a Venetian blind with horizontal slats, a pivoting window. This control uses information originating from one or more sensors, as described, for example, in patent application US 2001/000294.

This or these sensors are placed either inside the actuator of the home automation equipment item, or directly at the movable element.

When the sensor is in the actuator, it measures for example the rotation of the motor output shaft, or else the rotation of the output shaft of the reduction gear driven by the motor, or else if a jack is involved, the linear movement of the rod of the latter. In certain cases, the sensor measures an electric quantity that is the image of the speed of the motor: for example the voltage at the terminals of the phase displacement capacitor, if it involves a single-phase induction motor and running capacitor, or for example the electromotive movement force if it involves a direct current motor with permanent magnets.

The problem posed by these devices is that there is usually no proportional relation between the measured quantity and the movement of the movable equipment.

In the case of a roller blind for example, the panel of the blind rolls up on a tube. The result of the thickness of the panel is that the rolling radius increases as the blind opens. Depending on the nature of the panel, one and the same rotational movement value seen by the motor may give rise to very different panel movement values depending on whether the panel arrives at a top stop (maximum rolling diameter) or at a bottom stop (minimum rolling diameter). The result of this is a real difficulty in controlling the force that is not to be exceeded when the panel arrives in contact with a stop or an obstacle.

In the case of a tilting garage door, the vertical movement of the bottom of the door also obeys a nonlinear relation with the rotation of the drive motor making it possible to move a carriage on a horizontal rail. This is again reflected in very significant differences in the relation linking the motor torque and the force applied to the door, depending on the degree to which the latter is open. To control the force not to be exceeded when the door arrives in contact with an obstacle, it is a known practice to carry out a learning operation, making it possible, for example, to cut the trajectory into zones and adjust the value of the motor torque so that it is slightly greater than the necessary torque.

In the case of a Venetian blind with horizontal slats comprising a single motor, a device called a "tipper", driven by the rotation shaft, acts on ladders supporting the slats of the panel. The rotation of the rotation shaft causes that of the tipper and hence a greater or lesser inclination of the slats. In certain sunlight conditions, a minimal difference between the inclinations of the tippers of two adjacent Venetian blinds is enough to cause a very different visual effect. For the correct architectural uniformity of a facade, and the visual comfort of the occupants, it is important that the various equipment items are in the same state and hence to identify and reproduce precisely the angular positions of the motor corresponding to the extreme positions of the tipper. However, the actuators used to drive Venetian blinds most frequently comprise a rotation sensor placed at the output of the motor and not at the output of the reduction gear. The result of this is that the clearance of the reduction gear and, as a consequence, the compensation for the clearance that takes place during each inversion of direction, considerably influence the relation that exists between the value supplied by the sensor and the position of the home automation equipment item, so this relation has a hysteretic appearance. In addition, the intensity of the clearance is not constant but depends on the load applied, hence on the greater or lesser deployment of the Venetian blind panel. If the rotational control of the motor is applied directly based on the time of operation and not with a rotation sensor, the situation is yet worse because the times of opening and of locking the immobilization brake and/or the times for actuating the activation relays of the motor also play a part.

To remedy these various disadvantages, associated with the nonlinearity of the relation between input and output quantities, it is a known practice in certain cases to place the movement sensor directly on the movable element. Such a sensor then usually requires a physical contact between a fixed portion and a movable portion of the equipment.

DESCRIPTION OF THE PRIOR ART

For example, U.S. Pat. No. 5,198,974 and patent application FR 2 691 746 describe such devices in which it is possible to indirectly monitor the movement of the load bar of a roller blind.

Patent application US 2004/0187387 describes the transmission of voltage information originating from a microgenerator placed on the load bar and driven by the relative movement of the latter relative to the slides.

It is clear that these various sensors cause serious installation constraints from one case to another, considerably compromising their market development.

Other sensors do not require such a physical contact between the fixed portion and the movable portion, but it is because they benefit from a periodicity intrinsic to one of the portions. Patent application WO 05/085578 describes, for example, a contactless means of position metering in the case of linear motorization, for example of curtains on a rail. The disadvantage then is that the accuracy of detection is associated with the periodicity of the structure whose pitch is usually chosen based on totally different criteria.

Utility model DE 200 00 682 U1 discloses the use of an accelerometer on the load bar of a roller blind to detect intrusion attempts when the blind is closed, or the arrival at a stop when the blind motor is supplied. This use makes it possible to determine only a few particular positions of the roller blind such as the ends of travel.

SUMMARY OF THE INVENTION

The object of the invention is to provide a method of controlling the operation of home automation equipment items alleviating the cited disadvantages and improving the known methods of the prior art. In particular, the method allows the control of operation of a motorized home automation equipment item while dispensing with the possible non-linearity existing between the rotational position of the motor and the position of the home automation equipment item and without using a home automation equipment position sensor requiring a physical contact between a fixed portion and a movable portion of the equipment. The object of the invention is also to provide a home automation equipment item making it possible to apply such a method.

The configuration method according to the invention is characterized by the characterizing portion of claim 1.

Various embodiments of the configuration method are defined by dependent claims 2 to 5.

The control method according to the invention is defined by claim 6.

The home automation equipment item according to the invention is defined by claim 7.

DESCRIPTION OF THE DRAWINGS

The appended drawing illustrates, as examples, an embodiment of a home automation equipment item according to the invention and modes of execution of methods according to the invention.

DESCRIPTION OF THE PREFERRED EMBODIMENT(S)

Figure 1:
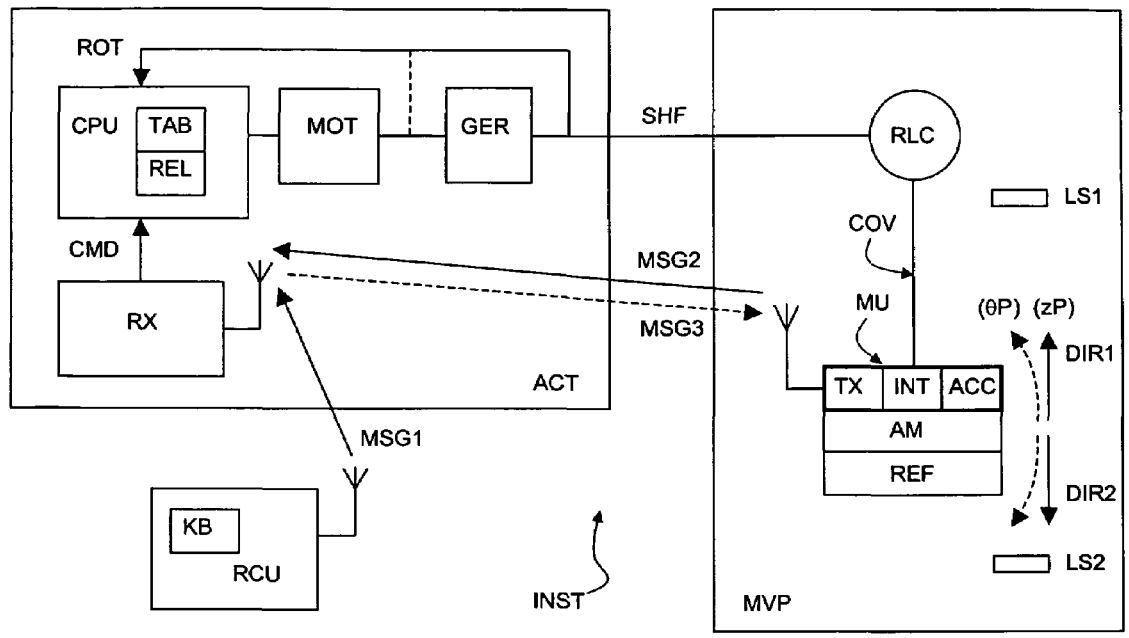
FIG. 1 is a diagram of an embodiment of a home automation equipment item according to the invention.

The home automation equipment item INST, shown in FIG. 1, comprises an actuator ACT furnished with a motor MOT whose output shaft drives a reduction gear GER. The output shaft SHF of the reduction gear GER forms the output shaft of the actuator. It is connected to the movable portion MVP of the home automation equipment item, whose movement it controls, being connected kinematically to a rolling tube RLC onto which a rollable movable element COV is rolled. Via the control of the electric supply of the motor, the movements of the rollable movable element are controlled. The rollable movable element COV comprises a reference element REF, for example one of the slats in the case of a roller blind.

The motor MOT is activated in a first direction or in a second direction by a unit CPU for controlling the supply of the motor MOT, this unit comprising for example a microcontroller. The control unit receives control commands via a command receiver RX connected to the latter via a link CMD. The commands are transmitted with the aid of a remote control interface RCU, for example a roaming unit, furnished with a man-machine interface KB comprising at least one control key. Preferably, the remote control interface RCU communicates by radio waves with the command receiver, as shown by the arrow MSG1. Preferably, the link between the control interface and the command receiver is of the bidirectional type, which makes it possible to display on the remote control interface RCU messages relating to the state of the actuator.

At least a first internal quantity ROT relative to the rotation of the motor is measured by the control unit CPU. This quantity is preferably given by the output of a rotation sensor placed at the output of the reduction gear GER. Alternatively, the rotation sensor may be placed at the output of the motor MOT, as shown by a dashed line. In a variant, the internal quantity ROT relative to the rotation of the motor is the duration of activation of the motor. In this case, this quantity is measured by a time counter of the microcontroller included in the control unit CPU.

In a variant, this internal quantity may be a quantity TQ relative to the mechanical torque supplied by the motor and measured directly at the motor, using the intensity of the current if the motor is a direct current motor with permanent magnets or by using the voltage at the terminals of the phase displacement capacitor if the motor is a single-phase induction motor with a running capacitor. Alternatively, the torque TQ is measured indirectly at the reduction gear or at any other portion of the actuator.

In each case, a combination of the various variants may also be used to define an internal quantity.

In the movable portion MVP of the home automation equipment item shown, the output shaft SHF of the actuator is connected to a movement conversion device RLC, which moves the rollable movable element COV. It may however also be a rigid movable element, but moving in a movement of translation-rotation, or else a movable element consisting of orientable and stackable slats. In all cases, the movement of a reference element REF of the movable element is characterized by a translation movement zP in a first direction DIR1 or in a second direction DIR2 in one and the same line opposite to the previous direction.

Alternatively, the movement of the reference element REF of the movable element is a rotary movement θP in one or other of the two opposite directions, as shown in FIG. 1 by the curved arrows in a dashed line.

The translation movement and/or the rotary movement is limited by a first stop LS1 and/or by a second stop LS2.

Alternatively, a combination of several movements is used, for example in a Venetian blind or for a tilting door.

In a preferred embodiment, a movement sensor MU is fixedly attached to the reference element, in a manner that does not hamper the movement of this element and does not have physical contact with the fixed portion of the home automation equipment item. This movement sensor comprises a three-axis accelerometer ACC, that is to say measuring acceleration along three axes. Alternatively, a two-axis accelerometer may be used, or even a simple unidirectional accelerometer in the case of a home automation equipment item that can be operated on single trajectories. It also comprises double integration means INT making it possible to deduce from the acceleration measurements the speed then the movement of the reference element. Finally it comprises a radio wave transmitter TX allowing the transmission of information to the receiver RX of the actuator ACT, as shown by the arrow MSG2. Preferably, the radio link is bidirectional, which allows the movement sensor MU to be activated only on receipt of an activation message transmitted by the actuator, as shown by the dashed line arrow MSG3. The communication protocols and frequencies are not necessarily identical between the actuator and the remote control unit and between the actuator and the movement sensor. The movement sensor comprises a "Sleep" mode in which it transmits no information to the actuator in order to reduce its consumption, and an "Active" mode in which it transmits information to the actuator. The transition from the sleep mode to the active mode is caused by the receipt of a particular control or, as a variant, directly by the detection of a beginning of movement.

Preferably, the movement sensor MU is attached removably to the reference element by using removable attachment means AM. In this manner, the movement sensor and, consequently, the accelerometer may advantageously be installed and removed without tools. The removable attachment means AM may, for example, include clipping means.

Figure 2:
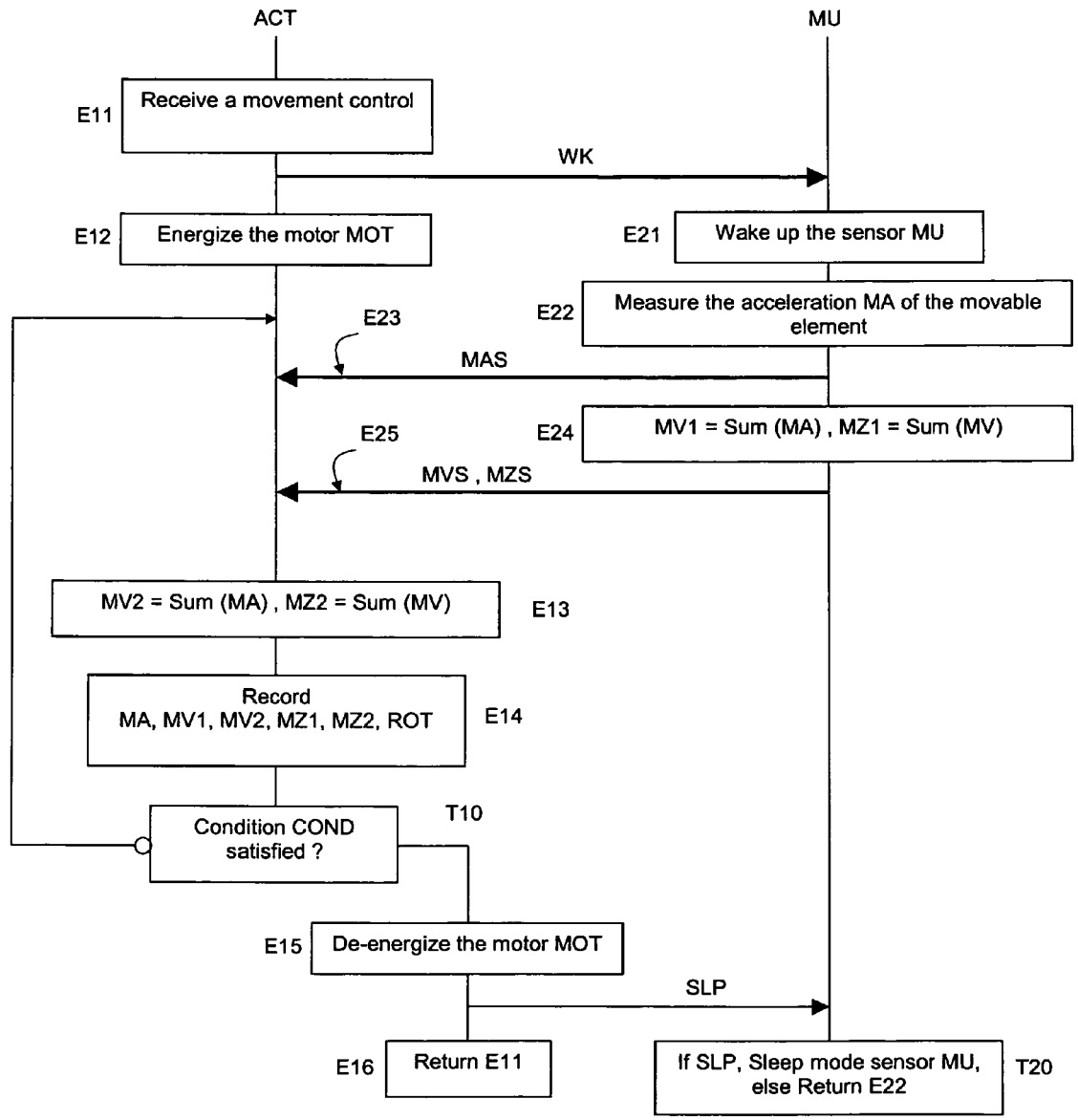
FIG. 2 is a flow diagram of a mode of execution of a control method according to the invention.

A mode of execution of the movement control method according to the invention is described with reference to FIG. 2 in the case of a roller blind. The movement sensor MU is fixedly attached to the load bar of the blind, forming the reference element REF.

The left portion of this figure shows the various steps of the method at the actuator, while the right portion represents the various steps of the method at the movement sensor.

In a preliminary step, the actuator is placed in a command-receiving mode, which allows it to receive a movement control transmitted by the remote control interface RCU.

In a first step E11, the actuator receives a movement control transmitted by the remote control interface RCU.

When such a control is received, the actuator transmits to the movement sensor MU a wakeup message WK, which has the effect of causing the movement sensor MU, in a step E21, to switch from the sleep mode to the active mode.

In a step E12, the motor MOT is activated in the direction of rotation corresponding to the command received in step E11. This causes the movable element to start moving.

In a variant of the method, no wakeup message WK is sent, and the wakeup step E21 is directly caused by a movement detection: the latter activates the radio wave transmitter TX of the movement sensor. In order that the detection is made sharply, the motor MOT may be briefly activated in the direction opposite to the movement command before being activated in the direction corresponding to the movement command.

In a step E22, the acceleration MA of the movable element is measured thanks to the accelerometer ACC and, in a step E23, an item of information on the measured value is transmitted to the actuator.

In a step E24, an integration is carried out within the integration means INT of the movement sensor to determine the instantaneous value of the speed MV1 and the instantaneous value of the vertical position of the reference element MZ1. The addition, at regular intervals, of the acceleration measurements gives a first speed measurement MV1. The addition, at regular intervals, of the first speed measurements gives a first position measurement MZ1. Information comprising speed values MV1 and/or position values MZ1 are immediately transmitted, in a step E25, to the actuator.

In a step T20, a test is run to see whether the movement sensor has received a sleep message SLP. If this is so, the movement sensor switches to sleep mode and, if this is not so, the movement sensor loops to step E22. In this way, therefore, the acceleration of the reference element is measured continuously during the activation of the motor MOT. By "continuously" it should be understood that the process repeats as frequently as the measurement and transmission means allow, the accuracy being limited only by the frequency of sampling or by the constraints of occupancy of the radiofrequency spectrum.

In order to reduce the number of transmissions, it is possible, as a variant, to transmit the acceleration measurement information MA only when there is a significant variation of this measurement, while only the first speed measurement MV1 and/or position measurement MZ1 information is transmitted repeatedly. The speed and/or position information transmissions then occur at a lower rate than that of the acceleration measurements and of integration (or addition) of these measurements: for example, one transmission for 10 measurement steps, and even one transmission for 100 measurement steps.

Conversely, the integration of the acceleration measurement data MA may take place in the actuator as shown in step E13, the addition of the acceleration measurements MA giving a second speed measurement MV2, the addition of the second speed measurements MV2 giving a second position measurement MZ2. In this case, the integration means INT form part of the actuator; they are for example incorporated into the control unit CPU.

In a step E14, the data set (measured directly or computed by integration) is recorded in a table TAB housed in the control unit CPU, as is the internal quantity of rotary measurement ROT. This record is particularly useful in configuration mode, during a first configuration or during periodic readjustments, or else for the purpose of maintaining the home automation equipment item. With the exception of these particular learning procedures for setting up or updating the table TAB, step E14 may be deleted.

Similarly, step E13 is useful only if the step E24 is not implemented in the method.

In a step T10, a test is run to see whether a particular condition COND is satisfied. This condition relates to the previous measurements and computations and their comparisons with thresholds that are predefined or defined based on the configuration values recorded in the table TAB.

The comparison relates to threshold values obtained by learning. It involves, for example, the comparison of the first position measurement MZ1 with two extreme values recorded during a configuration procedure.

It may also involve, for example, comparing the absolute acceleration measurement MA (current value) with a threshold value determined as a proportion of the peak value of this acceleration measured during the activation of the motor and stored in the table. If the signs are opposite and if the threshold value is exceeded, then the condition COND is satisfied.

The condition COND may also relate to the internal quantity ROT.

So long as the condition COND is not satisfied, the method loops to the output of step E12 for activation of the motor. The new information transmitted by the sensor is therefore acquired continuously.

If the condition COND is satisfied, then the method moves on to a step E15, in which the motor MOT is disabled. A sleep message SLP is then sent to the movement sensor and the sensor is, if necessary, placed in sleep mode. In a step E16, the method loops to the first step E11.

The test T10 is used in the method during any normal operation, and particularly during an automated operation of the installation. However, this test is not used, or may be only partially used, during a configuration operation, during which the installer himself controls the starting and stopping of the motor.

Figure 3:
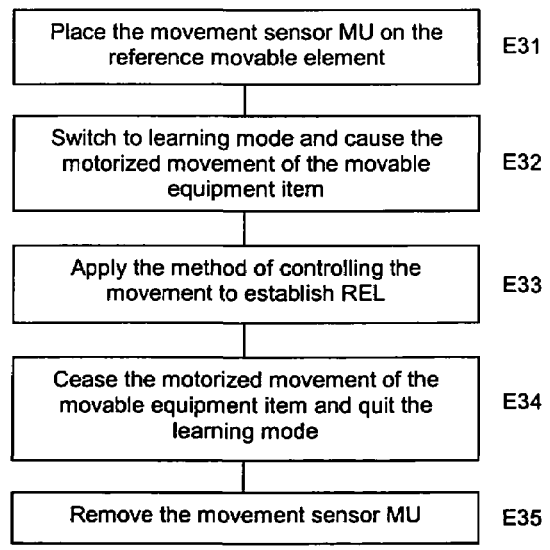
FIG. 3 is a flow diagram of a mode of execution of a configuration method according to the invention.

A mode of execution of the configuration method is described with reference to FIG. 3. This method makes it possible to use only one movement sensor in an installation comprising several home automation equipment items.

In a first step E31, the installer attaches the movement sensor MU to a reference element REF of a first home automation equipment item, for example to the load bar of a roller blind or else to an orientable slat of a Venetian blind.

In a second step E32, the installer switches the control unit CPU of the actuator of the first equipment item to a configuration mode, by causing, for example, a particular sequence of activations of the man-machine interface KB of the remote control interface RCU. This switch to configuration mode takes place for example based on a particular completely open or completely closed position of the roller blind or the Venetian blind. The installer then sends a movement control. Alternatively, it is the fact of being switched to configuration mode that causes the movement control.

In a third step E33, a movement control procedure, comprising substeps corresponding to certain of the steps E21, E22 (E24 and E25) or E13 and E14 previously described, is applied. This procedure makes it possible to establish a relation between the internal quantity ROT and the movement detected by the movement sensor MU based on continuous acceleration measurements. This procedure comprises at least step E22, step E23 and step E14. According to the variants, steps E13 and E24 are also active.

During step E14, the values of the internal quantity ROT and at least one of the measured (or computed) values of acceleration, speed or position MA, MV1, MV2, MZ1, MZ2 are recorded simultaneously.

This recording takes place in the form of a table, or preferably, in the form of a relation REL linking the internal quantity ROT to at least one of these values. As the internal quantity ROT may have several components, the relation REL may be multiple.

During a fourth step E34, the movement of the motor ceases, either due to a stop control transmitted by the installer when the product reaches a particular position, or because the actuator test T10 is active in configuration mode and it has detected the achievement of a condition COND causing the stoppage. The installer then quits configuration mode. Alternatively, the learning procedure is more complex, and requires, for example, a second movement in the direction opposite to the previous one before quitting configuration mode.

In a fifth step E35, the installer removes the movement sensor. The latter becomes available for the configuration of another home automation equipment item.

The value of one mode of execution of the configuration method is that it then allows a normal operation of the installation using a method of controlling the movements similar to that described with reference to FIG. 2 but from which the steps relating to the movement sensor MU are deleted. Specifically, the latter is now involved only indirectly, through the relation REL that it has allowed to be established, and that is then used to define a condition COND producing a motor stop command when it is satisfied or to define any other condition at the origin of any other control.

As a first example, the home automation equipment item is a roller blind operated by an actuator comprising a motor MOT of any type, fitted with a rotation sensor at the end of the shaft, and a reduction gear GER with an important clearance between the input shaft and the output shaft.

The relation REL established during the learning procedure makes it possible to link the position of the blind (MZ1 or MZ2) to the value measured by the rotation sensor delivering the internal quantity ROT. Only the quantity ROT may subsequently be used in the condition COND. Stopping will take place at a well-defined vertical position, although the measurement is made based on the rotation sensor, because the clearances are taken into account as is the variation of rolling radius.

In addition, in the phase for configuring the closure of the blind, if the latter has stackable slats, it will be possible to identify automatically several particular positions such as the precise position in which the final slat reaches the bottom stop (zero acceleration integral) and the position called the locking position of the blind, when the stacking of the slats ends and the panel becomes compressed by the rotary movement of the motor: this tensioning of the panel is reflected by a slight movement of the final slat that is detectable by the movement sensor MU.

As a second example, the movable equipment item is a roller blind and the motor is of the single-phase induction type with running capacitor. The internal quantity ROT comprises two components:
   the voltage ROT1 at the capacitor terminals (linked to the rotation speed of the motor) and
   the duration of operation ROT2.

The relation REL established during the learning procedure makes it possible to link the position of the blind. (MZ1 or MZ2) and/or its linear speed (MV1 or MV2) to the duration of operation ROT2. Knowledge of the rotation speed of the motor determined based on the voltage at the terminals of the capacitor ROT1 and its comparison with the linear speed makes it possible to know at any moment the rolling radius, and hence the relation between motor torque and force applied. For a motor supplied at a given voltage, the motor torque is directly linked to the speed of rotation: it is therefore then possible, in normal operation, to control the actuator based on the knowledge of the only two internal quantities ROT1 and ROT2, while ensuring the quality of the linear movement and a control of the force exerted on the final slat.

The same type of operation applies to a tilting garage door. In this case, the accelerometer will preferably be of the type that allows the detection of a movement along two axes (a horizontal axis and a vertical axis). A three-axis accelerometer may be less costly, even though the third axis is not used.

As a third example, the movable equipment item is a sun protection of the Venetian blind type, with horizontal and inclinable slats. The position sensor is preferably a two- or three-axis accelerometer. The motor is of the direct current type and the internal quantity ROT of the actuator comprises two components:
   the armature current of the motor ROT1,
   the duration of operation ROT2.

In configuration mode, the accelerometer is, for example, placed on an extension of the lowest inclinable slat of the Venetian blind that has been deployed as far as the lowest desired position. An automatic configuration cycle consists, in a first phase, in raising the panel of the Venetian blind until the slats are completely stacked. This event is identified both by the measurement of the stopping of the slat, given by the accelerometer, and by the armature current of the motor. It makes it possible to ascertain the length of the panel.

In fact the bottom slat does not stop totally at the moment when the top slat of all the stacked slats comes into contact with the head rail of the Venetian blind containing the actuator: if the motor continues to be supplied, the package of slats is progressively compressed against the head rail. This very slight movement is nevertheless detected by the accelerometer and makes it possible not only to make a sensitive measurement of the compression, but also to link this measurement to the increasing value of the armature current of the motor. For a maximum compression not to be exceeded, set by the manufacturer according to the elasticity of the slats and/or of the rolling cord, a value of the armature current of the motor, serving as a first internal quantity ROT1, may therefore be precisely determined.

In a second phase of the configuration cycle, the Venetian blind is progressively deployed, with one or more intermediate stops. During each intermediate stop, a reverse direction movement of the motor is engaged, which has the effect of activating the tipper and progressively inclining the slats, from a first completely closed position to a second completely closed position, as explained in patent application FR 2 863 647. Then, a direct direction movement is again effected to continue the deployment. During these movements, the durations of operation are recorded, and particularly the times between the beginning of rotation of the motor and the beginning of rotation of the slat: thus the mechanical clearances specific to this Venetian blind may be taken into account, in one direction as in the other, and this is done for various values of the load, that is to say for various values of deployment of the Venetian blind.

In addition, the angle of the slat relative to a vertical direction is measured precisely based on the information from the movement sensor (the accelerometer then operating as an inclinometer). A precise relation between the duration of operation and the angle of inclination of the slats may therefore also be established.

This data set constitutes a relation REL.

Subsequently, in normal operation, the relations REL established in each actuator, and theoretically different from one actuator to another, make it possible to control a set of Venetian blinds of one and the same facade, this time without their movement sensor MU, by communicating to the actuators common slat deployment and inclination setpoints. Each actuator determines the appropriate operation duration, based on a reference position identified precisely by analysis of the armature current of the motor.

A uniform control of the sun protections based on the position of the sun (or based on data from an astronomical clock) is therefore obtained at less cost, easily, thanks to the quality of the information supplied by the movement sensor during the configuration method.

If the movement sensor MU is permanently mounted on the movable product, the first step E31 and the last step E35 of the configuration method are deleted.

"Integration of a quantity" means any digital or analog method making it possible to obtain an image of the temporal mathematical integral of this quantity. The integration may be carried out digitally by adding the value of the measured quantity at regular intervals. It may also be carried out by an analog integrator, for example comprising an operational amplifier, a capacitor and a resistor. In this case, a single or double analog integrator is provided in the integration means INT.

The invention claimed is:

1. A method of configuring a control unit of an actuator including a motor for operating a movable element of a home automation equipment item of closure, privacy, sun protection or screening, which comprises:
   a phase for supplying the motor during which at least one characteristic quantity of the movement of the movable element is obtained with the aid of a measurement procedure comprising at least one step of integrating a physical quantity supplied by an accelerometer, at least one quantity internal to the actuator being measured during this supply phase, and
   a phase for determining a possibly nonlinear relation between the characteristic quantity and the internal quantity, so as to enable later control movements of the actuator without use of the accelerometer.

2. The configuration method as claimed in claim 1, wherein the characteristic quantity is a length of movement or an angle of movement.

3. The configuration method as claimed in claim 1, wherein the internal quantity comprises at least one value of the position of a shaft of the actuator, one value of speed or of current of the motor, or one value of duration of activation of the actuator.

4. The configuration method as claimed in claim 1, wherein the determination phase takes place during the supply phase.

5. The configuration method as claimed in claim 1, wherein the supply phase is preceded by a phase for installing the accelerometer on the movable element, and wherein the determination phase is followed by a phase of removal of the accelerometer from the movable element.

6. A method of controlling an actuator including a motor for operating a movable element of a home automation equipment item of closure, privacy, sun protection or screening, wherein the action control is generated by using the quantity internal to the actuator and the relation previously established by use of the configuration method as claimed in claim 1.

7. A home automation equipment item of closure, privacy, sun protection or screening comprising a movable element, which comprises an accelerometer attached to the movable element and hardware means and software means for applying the method of claim 1.

8. The home automation equipment item as claimed in claim 7, which comprises means for removably attaching the accelerometer to the movable element.

* * * * *